UNITED STATES PATENT OFFICE.

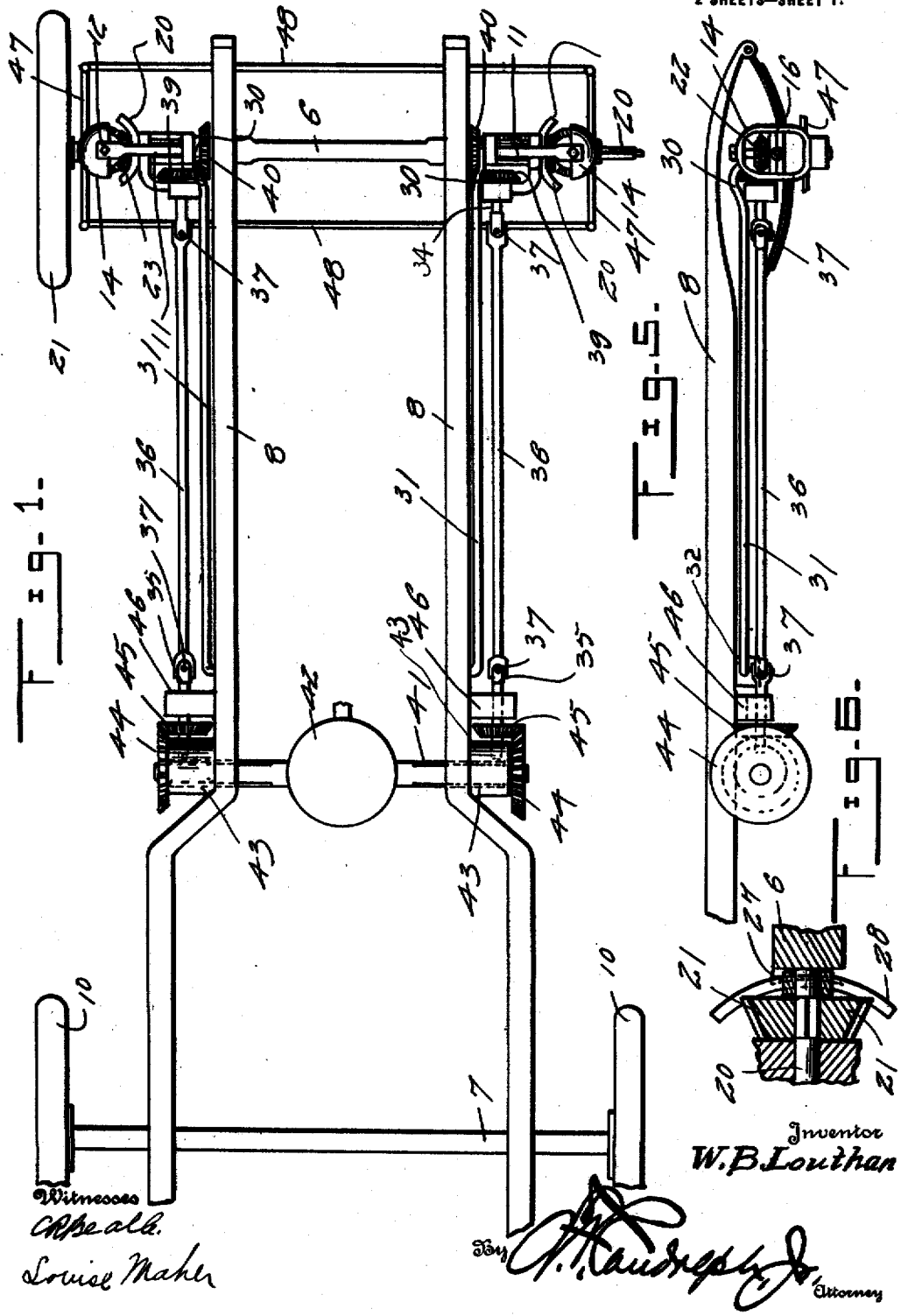

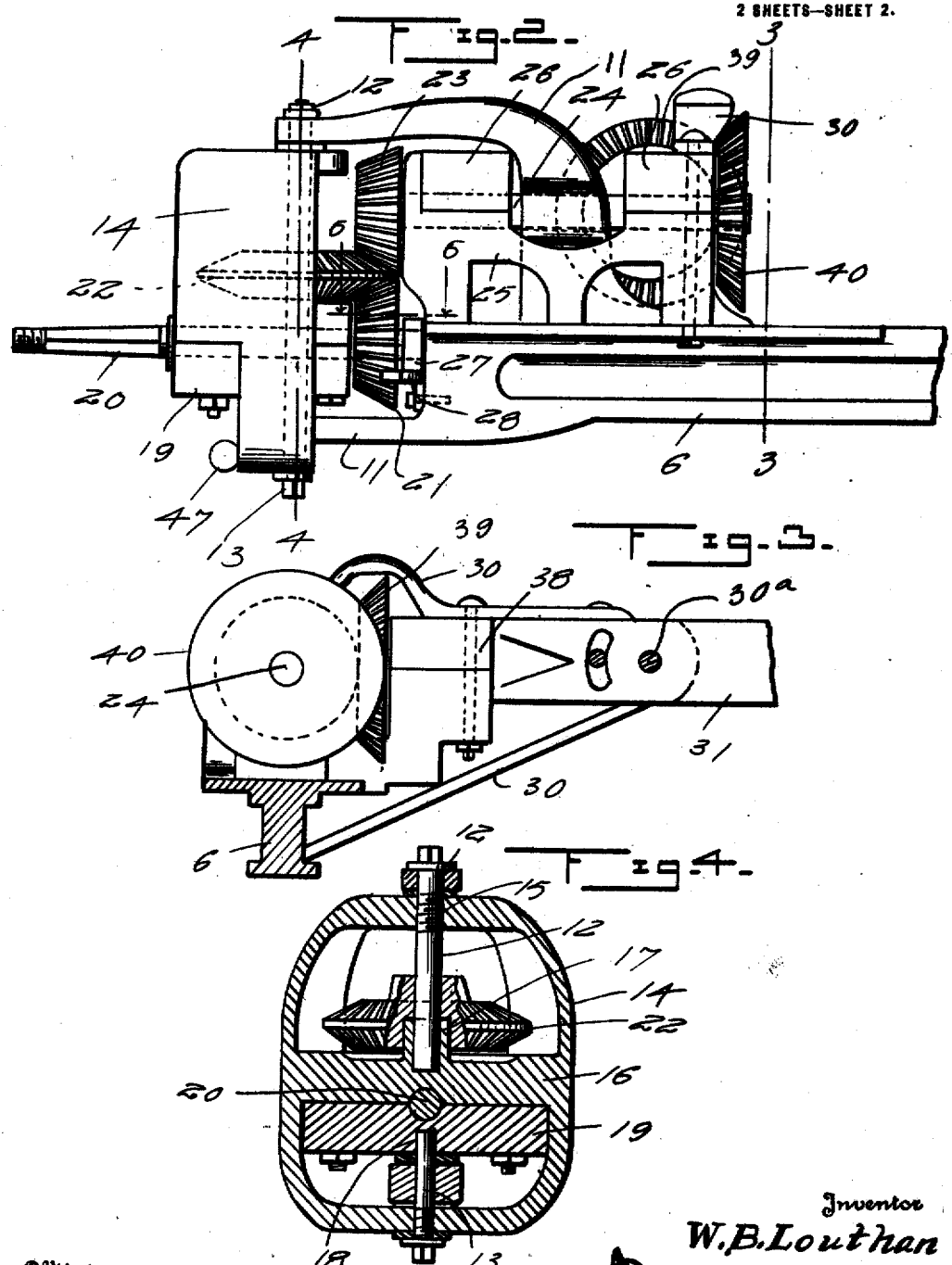

WALLACE B. LOUTHAN, OF MARSHALLTOWN, IOWA.

MOTOR-VEHICLE.

1,317,981.  Specification of Letters Patent.  Patented Oct. 7, 1919.

Application filed September 14, 1917. Serial No. 191,432.

*To all whom it may concern:*

Be it known that I, WALLACE B. LOUTHAN, a citizen of the United States, residing at Marshalltown, in the county of Marshall and State of Iowa, have invented certain new and useful Improvements in Motor-Vehicles, and that I do hereby declare the following to be a full, clear, and exact description of the invention, such as will enable others skilled in the art to which it appertains to make and use the same.

This invention relates to improvements in motor vehicles and has for its object to provide an improved driving mechanism for the vehicle by which the power is transmitted to the front wheels for propelling the vehicle.

Another object is the provision of a novel type of gearing supported upon the front axle for transmitting the movement of the drive shaft to the front steering wheel with a minimum frictional loss.

With these and other objects in view, the invention consists in the novel combination and arrangement of parts hereinafter more fully described and claimed and set forth in the accompanying drawings, in which:

Figure 1 represents a plan view of a motor vehicle partly broken away, one of the front steering wheels being removed, Fig. 2 represents an enlarged front elevation of one end of the front axle, Fig. 3 represents a vertical sectional view through the axle on the line 3—3 of Fig. 2, Fig. 4 represents a vertical sectional view through the steering knuckle on the line 4—4 of Fig. 2, and Fig. 5 represents a fragmentary side elevation of the vehicle.

Fig. 6 represents a detail sectional view on the line 6—6 of Fig. 2.

Referring to the drawings in detail wherein similar reference numerals designate corresponding parts throughout the several views, the numerals 6 and 7 indicate the front and rear axles of a vehicle supporting the side members 8. Springs (not shown) are preferably interposed between the side members of the frame and the front and rear axles, and the rear axle is equipped with the usual rear wheels 10.

Each end of the axle 6 is provided with integral parallel arms 11 having apertured terminals receiving the upper and lower spindle bolts 12 and 13, respectively. The steering knuckle 14 is engaged at its top and bottom beneath the upper and lower axle arms 11 and the threaded portions 15 of the spindle bolts are received within correspondingly threaded openings formed in the knuckle, whereby the latter is pivotally secured on a vertical axis to the end of the front axle 6. The medial portion of the steering knuckle 14 is formed with an integral web 16 having a recessed boss 17 receiving the lower terminal of the upper spindle bolt 12.

The lower spindle bolt 13 extends upwardly through the lower part of the knuckle 14 and the lower axle arm 11 and is pivotally received within a recess 18 formed in a bearing plate 19, which is bolted or otherwise detachably secured underneath the web 16.

The spindle 20 for each front wheel 21 of the vehicle is rotatably confined between the horizontal web 16 and the bearing plate 19 and the inner terminal thereof, which terminates between the arms 11 is provided with a relatively non-rotatable beveled gear wheel 21, which meshes with the lower series of teeth formed on the double bevel gear wheel 22. The wheel 22 is rotatably supported upon the upper spindle bolt 12 and the upper series of teeth thereon mesh with a beveled gear wheel 23 supported upon a horizontal shaft 24.

The lower half 25 of a shaft bearing is formed integral with the terminal of the axle 6 and detachably supports the upper bearing plates 26 supporting the shaft 24.

The double gear wheel 22 is rotatable upon the spindle 12 and as its axis coincides with the vertical axis of the steering knuckle 14, the latter may be readily turned as in steering the vehicle without affecting the driving connection between the shaft 24 and spindle 20.

The extreme inner terminal of each spindle 20 rotatably supports a roller 27 movable upon an arcuate track 28 secured between the bifurcations or arms 11 of the front axle. The track 28 is curved concentrically with the pivotal axis of the steering knuckle 14, so as to permit the roller 27 to travel thereon during swinging movement of the knuckle.

The front terminals of brace rods 31 are pivotally secured at 30ᵃ to a fork 30 carried by the bearing members 26 and front axle 6 respectively, and they extend rearwardly at right angles to the shaft 24 and in substantially parallel relation to the side members 8 of the vehicle body and are swivelly mounted, as indicated at 32, directly opposite the joint 37, in the side members 8. The brace rods 31 maintain the front and rear axles 6 and 7 in true parallel relation and prevent skewing of the front axle during propulsion of the vehicle by the front wheels 21.

Drive shafts 36 are arranged outwardly and at right angles to shaft 24 in substantially parallel relation to the forward parallel terminals of the side members 8 and each shaft consists of the two end sections 34 and 35 and the relatively long central section 36. The several sections are connected by universal joints 37 and the front section 34 is journaled in a bearing 38 provided adjacent the end of the front axle 6. A beveled gear wheel 39 is non-rotatably secured upon the forward section 34 and meshes with the beveled gear wheel 40 carried by the inner terminal of the shaft 24, whereby a driving connection between the shaft 36 and the spindle 20 is established through the gear wheels 39, 40, shaft 24 and the several gear wheels 23, 22 and 21.

An axle 41 is suspended below the medial portion of the side members 8 in parallel relation to the front and rear axles and is provided with a preferred type of differential 42 having connection with the vehicle engine (not shown). The terminals of the axle or shaft 41 are journaled in bearing members 43 and are provided with beveled gear wheels 44, which mesh with corresponding gear wheels 45 carried by the rear shaft sections 35. Bearing members 46 and 43 are attached to the side members 8 of the vehicle chassis for supporting the rear shaft sections 35 and the differential gear 42 is designed to compensate for the variable speed of the steering wheels 21, as it is necessary when the vehicle is making a curve in the roadway.

Each steering knuckle 14 is provided with a steering arm 47, which extends forwardly and rearwardly of the front axle and the arms of the respective knuckles at the opposite ends of the axle are connected by the parallel connecting rods 48 having connection with a preferred type of steering gear (not shown) for controlling the steering movement of the front wheels.

What I claim is:

A device of the character set forth including an axle having a bifurcated end, upper and lower spindle bolts journaled to the ends of said axle, a steering knuckle pivoted on the bolts, a web formed in said knuckle and having a recess rotatably receiving the lower end of the upper spindle bolt, a bearing plate secured to said web and having a recess rotatably receiving the upper end of the lower spindle bolt, a double pinion journaled on the upper spindle bolt, means driving said pinion, an axle spindle journaled between the plate and web, a second pinion secured to the axle spindle and in mesh with the double pinion, a track secured to the axle and a roller mounted on the inner end of the axle spindle and movable over said track.

In testimony whereof I affix my signature in presence of two witnesses.

WALLACE B. LOUTHAN.

Witnesses:
H. M. ELLIS,
W. E. LEECH.

Copies of this patent may be obtained for five cents each, by addressing the "Commissioner of Patents, Washington, D. C."